US012723732B2

(12) United States Patent
Kim et al.

(10) Patent No.: US 12,723,732 B2
(45) Date of Patent: *Sep. 1, 2026

(54) REAR LAMP DEVICE OF VEHICLE

(71) Applicant: HYUNDAI MOBIS CO., LTD., Seoul (KR)

(72) Inventors: Min Ji Kim, Yongin-si (KR); Do Hyung Kim, Yongin-si (KR); Phil Su Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/307,536

(22) Filed: Aug. 22, 2025

(65) Prior Publication Data

US 2026/0160402 A1 Jun. 11, 2026

(30) Foreign Application Priority Data

Dec. 10, 2024 (KR) ........................ 10-2024-0182698

(51) Int. Cl.

*F21S 43/50* (2018.01)
*F21S 43/20* (2018.01)

(52) U.S. Cl.

CPC ............. *F21S 43/50* (2018.01); *F21S 43/265* (2024.05)

(58) Field of Classification Search

CPC ................ F21S 43/20–2817; F21S 43/50–601
See application file for complete search history.

(56) References Cited

FOREIGN PATENT DOCUMENTS

DE 102017117390 A1 * 2/2019 ........... G03H 1/2202
KR 10-2023-0005581 A 1/2023

* cited by examiner

*Primary Examiner* — Jason M Han
(74) *Attorney, Agent, or Firm* — NSIP Law

(57) ABSTRACT

A rear lamp device for a vehicle is provided. The rear lamp device includes: a housing part provided in a rear portion of a vehicle body; a lens part coupled to the housing part and covering an opening provided in the housing part; an emblem part provided in the lens part; a light source part installed in the housing part and configured to irradiate light into an interior of the housing part; a bezel part coupled to the housing part and disposed inside the housing part; and a holographic plate part disposed between the lens part and the bezel part. A holographic stereoscopic image is displayed in response to the light source part being turned on.

16 Claims, 11 Drawing Sheets

REAR LAMP DEVICE OF VEHICLE

CROSS-REFERENCE TO RELATED APPLICATION

This application claims the benefit under 35 U.S.C. § 119(a) of priority to Korean Patent Application No. 10-2024-0182698 filed on Dec. 10, 2024, in the Korean Intellectual Property Office, the entire disclosure of which is incorporated herein by reference for all purposes.

BACKGROUND

1. Field

Exemplary embodiments of the present disclosure relate to a rear lamp device of a vehicle, and more particularly, to a rear lamp device of a vehicle, capable of implementing rear lighting.

2. Description of the Related Art

In recent years, vehicle manufacturers have been trying to fill the rear of electric vehicles with visual density with differentiated lighting images, trying to give new value to the existing rear emblem area through unexpected effects, and investing a lot of money in three-dimensional (3D) lighting for eye-catching visual effects.

Previously, there were limitations in rear lighting content and technology implementation solutions that could effectively express brand identity, and as the lighting area expanded to the rear emblem area, various problems occurred, such as increased development costs and production costs, and increased weight due to the use of multiple lighting devices. Therefore, there is a need to improve these problems.

The background technology of the present disclosure is disclosed in Korean Patent Publishment No. 10-2023-0005581 (published on Jan. 10, 2016, entitled "REAR LAMP DEVICE FOR VEHICLE").

SUMMARY

Various embodiments are directed to a rear lamp device of a vehicle capable of providing a three-dimensional image to a driver, surrounding vehicles, and pedestrians through implementation of rear lighting.

In a general aspect, a rear lamp device for a vehicle, includes: a housing part provided in a rear portion of a vehicle body; a lens part coupled to the housing part and covering an opening provided in the housing part; an emblem part provided in the lens part; a light source part installed in the housing part and configured to irradiate light into an interior of the housing part; a bezel part coupled to the housing part and disposed inside the housing part; and a holographic plate part disposed between the lens part and the bezel part, wherein a holographic stereoscopic image is displayed in response to the light source part being turned on.

The hologram plate part may be configured to receive light irradiated from the light source part, and display the holographic stereoscopic image corresponding to a shape of the emblem part.

The rear lamp device may further include a reflection part disposed between the light source part and the hologram plate part and configured to reflect the light emitted from the light source part toward the hologram plate part.

The reflection part may include: a first reflection part disposed at a first position of the housing part and configured to reflect the light emitted from the light source part; and a second reflection part disposed at a second position of the housing part spaced apart from the first reflection part and configured to face the first position to reflect light reflected by the first reflection portion toward the hologram plate part.

The second reflection part may include a reflection surface having a parabolic curved shape.

The rear lamp device may further include a light blocking layer part provided on the lens part and disposed to partially block the light irradiated from the light source part.

The light blocking layer part may include: a non-transmission part through which the light irradiated from the light source part is not transmitted; and a light transmission part through which the light irradiated from the light source part passes.

The light transmission part may not interfere with the emblem part, wherein the non-transmission part may have the same color as the vehicle body.

The light source part may be lit with a tail lamp.

The bezel part may be provided with a pattern unit that is recognized from outside through the lens part.

In another general aspect, a lamp device for a vehicle, includes: a housing part provided in a rear portion of a vehicle body; a lens part coupled to the housing part and covering an opening provided in the housing part; an emblem part provided in the lens part; a light source part installed in the housing part; a bezel part coupled to the housing part and disposed inside the housing part; a holographic plate part disposed between the lens part and the bezel part; and a controller configured to control the light source to irradiate light into an interior of the housing part, and control the light source and the holographic part to display a holographic stereoscopic image.

The hologram plate part may be configured to receive light irradiated from the light source part, and display the holographic stereoscopic image corresponding to a shape of the emblem part.

The lamp device may further include a reflection part disposed between the light source part and the hologram plate part and configured to reflect the light emitted from the light source part toward the hologram plate part.

The lamp device may further include a light blocking layer part provided on the lens part and disposed to partially block the light irradiated from the light source part.

The light source part may be lit with a tail lamp.

The bezel part may be further provided with a pattern unit that is recognized from outside through the lens part.

DETAILED DESCRIPTION

Figure 1:
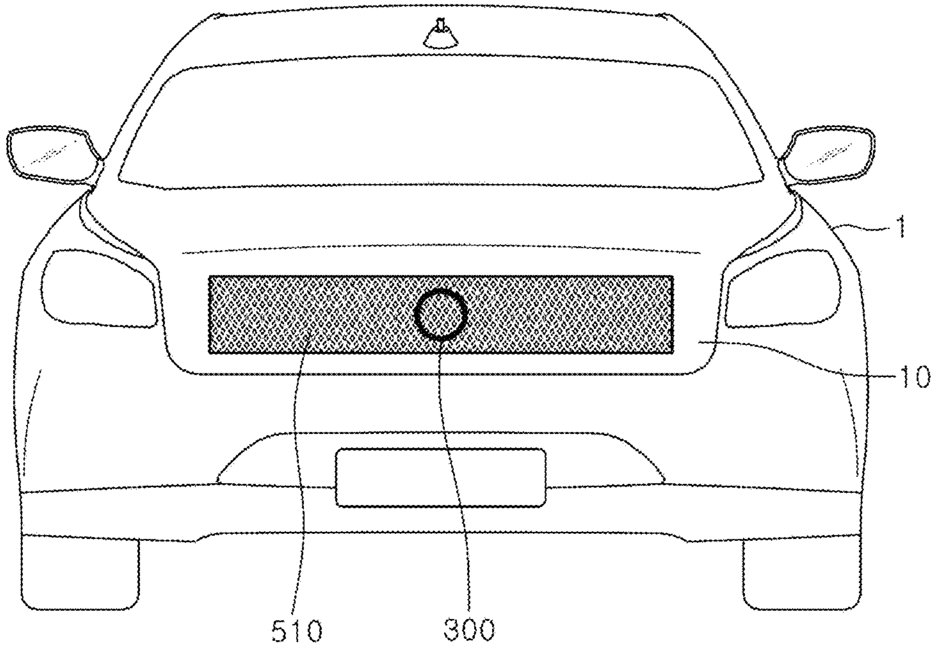
FIG. 1 is a view from the rear of a vehicle in which a light source unit is not turned on in a rear lamp device of the vehicle according to a first embodiment of the present disclosure.

Hereinafter, a rear lamp device of a vehicle according to the embodiment of the present disclosure is described in detail below with reference to the accompanying drawings through various exemplary embodiments. It should be considered that the thickness of each line or the size of each component in the drawings may be exaggeratedly illustrated for clarity and convenience of description.

In addition, terms to be described below have been defined by taking into consideration their functions in the present disclosure, and may be different depending on a user or operator's intention or practice. Accordingly, such terms should be interpreted based on the overall contents of this specification.

Figure 2:
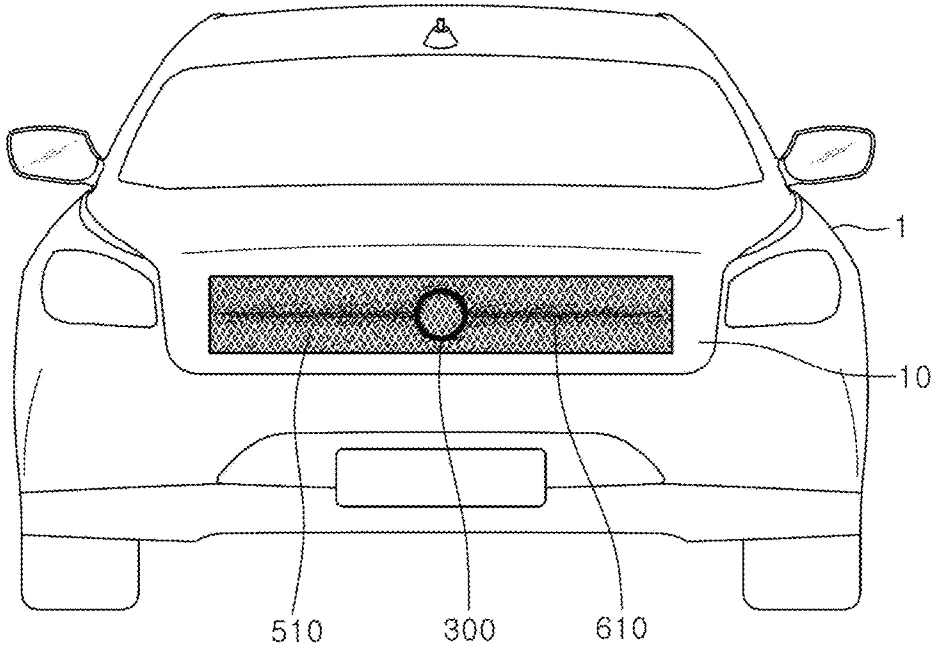
FIG. 2 is a view from the rear of a vehicle in which a light source unit is turned on in a rear lamp device of the vehicle according to a first embodiment of the present disclosure.
Figure 3:
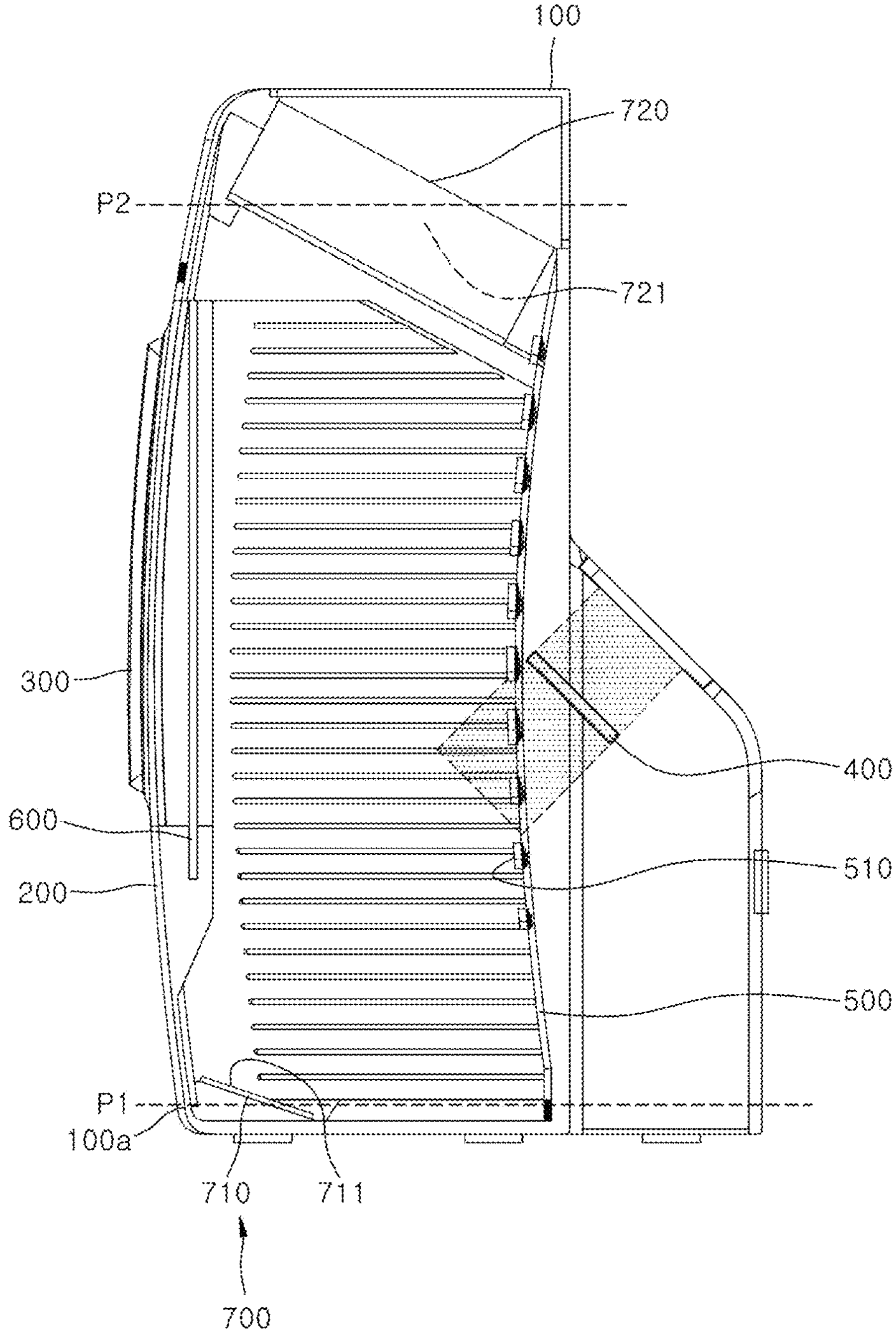
FIG. 3 is a schematic cross-sectional view of a rear lamp device of a vehicle according to a first embodiment of the present disclosure.
Figure 4:
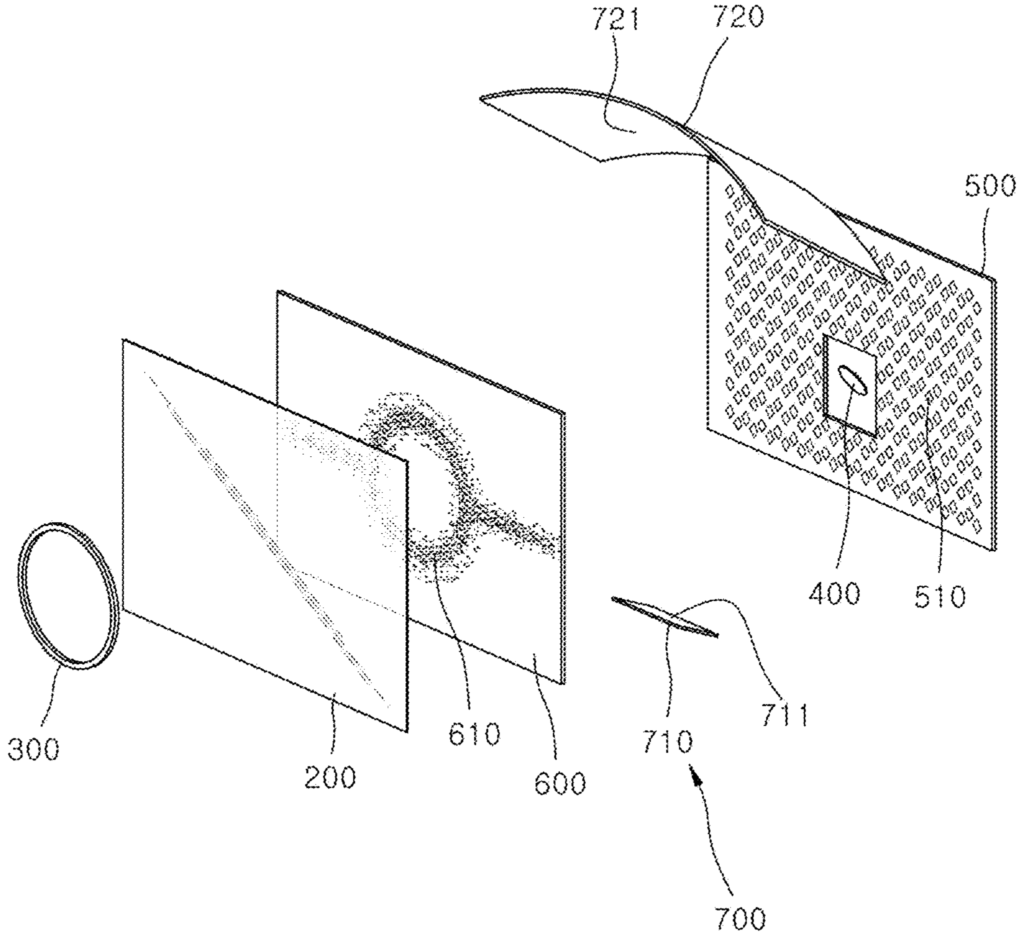
FIG. 4 is an exploded perspective view schematically illustrating a rear lamp device of a vehicle according to a first embodiment of the present disclosure.
Figure 5:
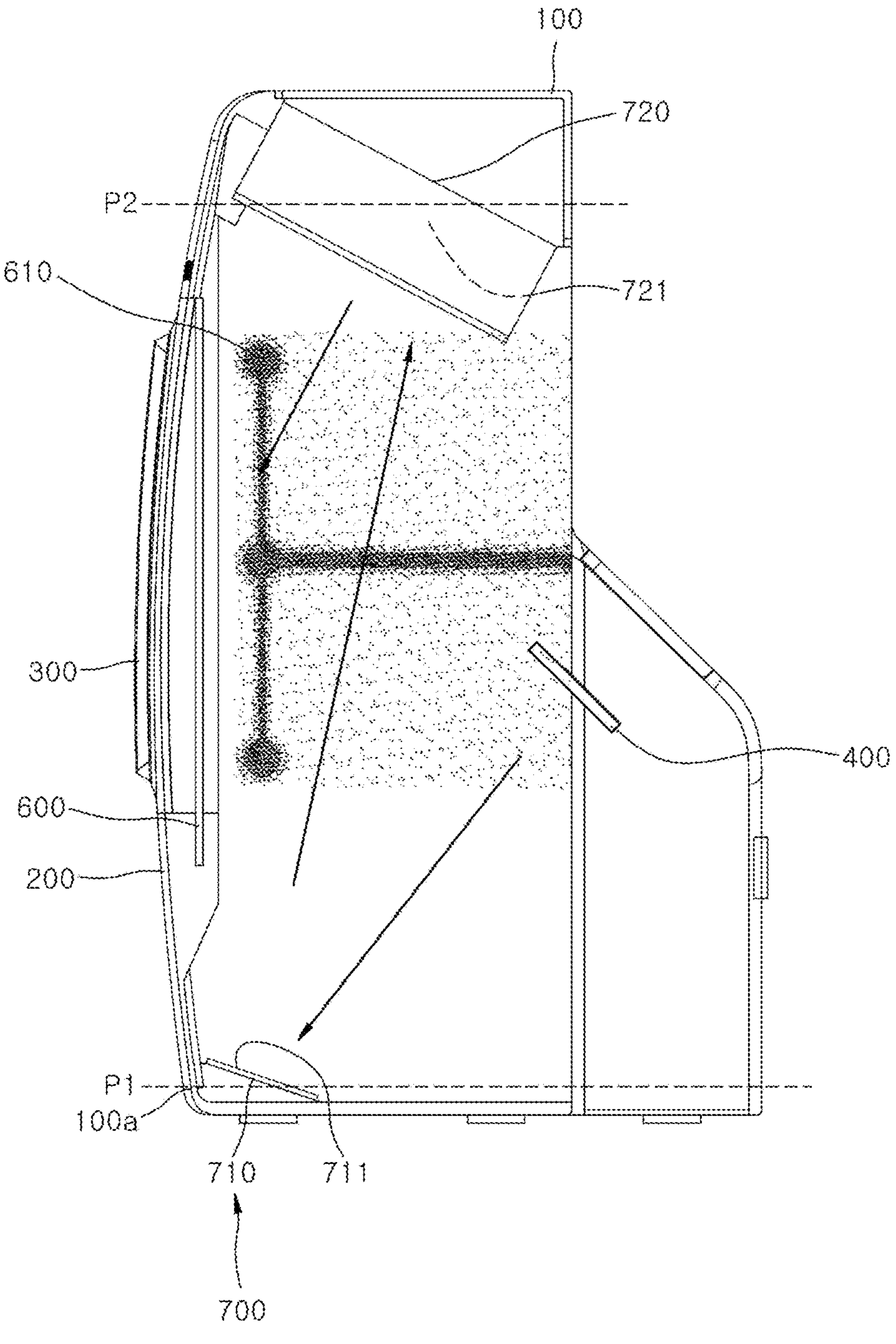
FIG. 5 is a view illustrating a path of light in a rear lamp device of a vehicle according to a first embodiment of the present disclosure.

FIG. 1 is a view from the rear of a vehicle in which a light source unit is not turned on in a rear lamp device of the vehicle according to a first embodiment of the present disclosure. FIG. 2 is a view from the rear of a vehicle in which the light source unit is turned on in the rear lamp device of a vehicle according to the first embodiment of the present disclosure. FIG. 3 is a schematic cross-sectional view of the rear lamp device of a vehicle according to the first embodiment of the present disclosure. FIG. 4 is an exploded perspective view schematically illustrating the rear lamp device of a vehicle according to the first embodiment of the present disclosure. FIG. 5 is a view illustrating a path of light in the rear lamp device of a vehicle according to the first embodiment of the present disclosure.

Referring to FIG. 1 to FIG. 5, the rear lamp device of a vehicle according to the first embodiment of the present disclosure includes a housing part 100, a lens part 200, an emblem part 300, a light source part 400, a bezel part 500, a hologram plate part 600, and a reflection part 700, and the detailed description is as follows.

The housing part 100 is mounted on a vehicle body 1. The housing part 100 is provided on a rear surface of the vehicle body 1 facing the rear of the vehicle, that is, a rear portion 10 of the vehicle body 1.

The housing part 100 forms the overall appearance of the rear lamp device of the vehicle, and supports the lens part 200, the emblem part 300, the light source part 400, the bezel part 500, the hologram plate part 600, and the reflection part 700.

The housing part 100 may have a box shape with an empty inside, and may be formed in a shape in which the front surface facing the rear of the vehicle body 1 is opened.

The lens part 200 is coupled to the housing part 100. The lens part 200 is formed in a substantially plate shape, may have a shape that entirely surrounds the bezel part 500, and the edge thereof may be fixed to an edge of the housing part 100 through various coupling methods such as bolting, adhesion, and fitting.

The lens part 200 is formed in a flat or curved shape to match the shape of an opening 100*a* formed in the housing part 100. The lens part 200 covers the opening 100*a* provided in a front surface of the housing part 100.

The lens part 200 may be exposed to the outside and includes a transparent material that transmits light. The lens part 200 includes a plastic material. For example, the lens part 200 may include polymethyl methacrylate, but is not limited thereto and may include polycarbonate, polypropylene, and the like.

The emblem part 300 is provided in the lens part 200. The emblem part 300 is provided on an outer surface of the lens part 200 facing the rear of the vehicle body 1. The emblem part 300 is formed in an embossed shape protruding from the lens part 200.

In an embodiment, the emblem part 300 may be integrally formed with the lens part 200. For example, the emblem part 300 may be injection-molded in the lens part 200.

In another embodiment, the emblem part 300 is coupled to the lens part 200. For example, the emblem part 300 may be fixed to the lens part 200 through various coupling methods such as bolting, adhesion, and fitting.

The emblem part 300 may be recognized from the outside. The emblem part 300 may be recognized from the outside when the light source part 400 is turned on or even when the light source part 400 is not turned on.

The light source part 400 is installed in the housing part 100. The light source part 400 is accommodated inside the housing part 100. The light source part 400 is disposed at a position spaced apart from the lens part 200 and facing the lens part 200.

The light source part 400 irradiates light into the housing part 100. The light source part 400 irradiates light toward a direction in which the hologram plate part 600 is located.

The light source part 400 may include a light emitting diode (LED) or a light amplification by simulated emission of radiation (LASER).

The bezel part 500 is coupled to the housing part 100. The bezel part 500 is disposed inside the housing part 100. The bezel part 500 may be formed in an approximately plate shape and may be coupled to an inner surface of the housing part 100 facing the lens part 200.

The bezel part 500 is disposed to be spaced apart from the lens part 200. The bezel part 500 is formed in the same shape as the shape of the lens part 200.

The bezel part 500 may be recognized from the outside through the lens part 200. At least one color pigment may be coated on the bezel part 500. The pigment may include a red dye, a green dye, a blue dye, a black dye, and the like. For example, the bezel part 500 is made of black and may recognize the black color of the bezel part 500 from the outside through the lens part 200.

A pattern unit 510 is provided in the bezel part 500. The pattern unit 510 is provided on an outer surface of the bezel part 500 facing a direction in which the lens part 200 is located. The pattern unit 510 is formed in an embossed shape protruding from the bezel part 500.

As an example, the pattern unit 510 is integrally formed with the bezel part 500. For example, the pattern unit 510 may be injection-molded on the bezel part 500.

In another embodiment, the pattern unit 510 may be coupled to the bezel part 500. For example, the pattern unit 510 may be fixed to the bezel part 500 through various coupling methods such as bolting, adhesion, fitting, and the like.

A plurality of unit patterns having various shapes and/or different sizes may be regularly or irregularly disposed in the bezel part 500. The pattern unit 510 may include a lencell pattern.

The pattern unit 510 may be recognized from the outside through the lens part 200. For example, when the color of the bezel part 500 is black and the color of the pattern unit 510 is white, the shape of the pattern unit 510 may be recognized through the lens part 200.

The pattern unit 510 is recognized from the outside through the lens part 200 even when the light source part 400 is turned on as shown in FIG. 1 or when the light source part 400 is turned on as shown in FIG. 2.

The hologram plate part 600 is disposed between the lens part 200 and the bezel part 500. The hologram plate part 600 is spaced apart from the bezel part 500 and disposed at a rear side of the lens part 200.

The hologram plate part 600 displays a holographic stereoscopic image 610. In an embodiment, the hologram plate part 600 may be formed in the form of a transparent or translucent lens or film that transmits or reflects light.

In another embodiment, the hologram plate part 600 may include a transparent hologram lens part and a hologram film part coupled to the hologram lens part to form a holographic stereoscopic image 610 when the light source part 400 is turned on.

The hologram plate part 600 is installed inside the housing part 100 to form the holographic stereoscopic image 610 when the light source part 400 is turned on as shown in FIG. 2 and FIG. 5. The hologram plate part 600 may implement a 3D stereoscopic image as if floating in an inner space of the housing part 100.

The hologram plate part 600 receives light irradiated from the light source part 400 and displays the holographic stereoscopic image 610 corresponding to the shape of the emblem part 300. In particular, a dramatic effect can be produced through an optical illusion effect in a lighting situation of the light source part 400.

The reflection part 700 is installed inside the housing part 100. The reflection part 700 is disposed between the light source part and the hologram plate part.

The reflection part 700 reflects the light emitted from the light source part 400 to change a path of the light. The reflection part 700 reflects the light emitted from the light source part 400 toward the hologram plate part 600.

The light source part 400 according to the present embodiment may be disposed to be inclined at a set angle. The light source part 400 may emit light at a set angle toward an upper side or a lower side of the housing part 100.

In the present disclosure, the light source part 400 is installed at an angle inclined downward toward the lower side of the housing part 100 so that the light is irradiated toward the lower side of the housing part 100.

The internal space of the housing part 100 can be reduced by the reflection part 700 that reflects the light emitted from the light source part 400. The path of light is indicated by an arrow.

The reflection part 700 according to the present embodiment includes a first reflection part 710 and a second reflection part 720.

The first reflection part 710 is installed inside the housing part 100. The first reflection part 710 is disposed at a first position P1 of the housing part 100. Here, the first position P1 refers to the lower side of the housing part 100.

The first reflection part 710 is disposed to be spaced apart from the light source part 400 and face the light source part 400. The first reflection part 710 is installed to be inclined at a set angle. The first reflection part 710 is provided with a reflection surface 711 having a planar shape.

The first reflection part 710 reflects the light emitted from the light source part 400 toward the second reflection part 720. The first reflection part 710 reflects the light emitted from the light source part 400 and diffuses the light at the same time.

The second reflection part 720 is installed in the housing part 100. The second reflection part 720 is disposed to be spaced apart from the first reflection part 710 and face the first reflection part 710.

The second reflection part 720 is disposed at a second position P2 of the housing part 100. Here, the second position P2 refers to the upper side of the housing part 100 facing the first position P1.

The second reflection part 720 is disposed to be inclined at a set angle. The second reflection part 720 reflects the light reflected by the first reflection part 710 toward the hologram plate part 600. An area of the second reflection part 720 is greater than an area of the first reflection part 710.

A reflection surface 721 having a parabolic curved shape is provided in the second reflection part 720 according to the present embodiment.

The second reflection part 720 reflects the light reflected by the first reflection part 710 in the form of parallel light toward the rear surface of the hologram plate part 600.

The hologram plate part 600 receives the light irradiated from the light source part 400 to form the holographic stereoscopic image 610 corresponding to the shape of the emblem part 300 in a space between the hologram plate part 600 and the bezel part 500.

Figure 6:
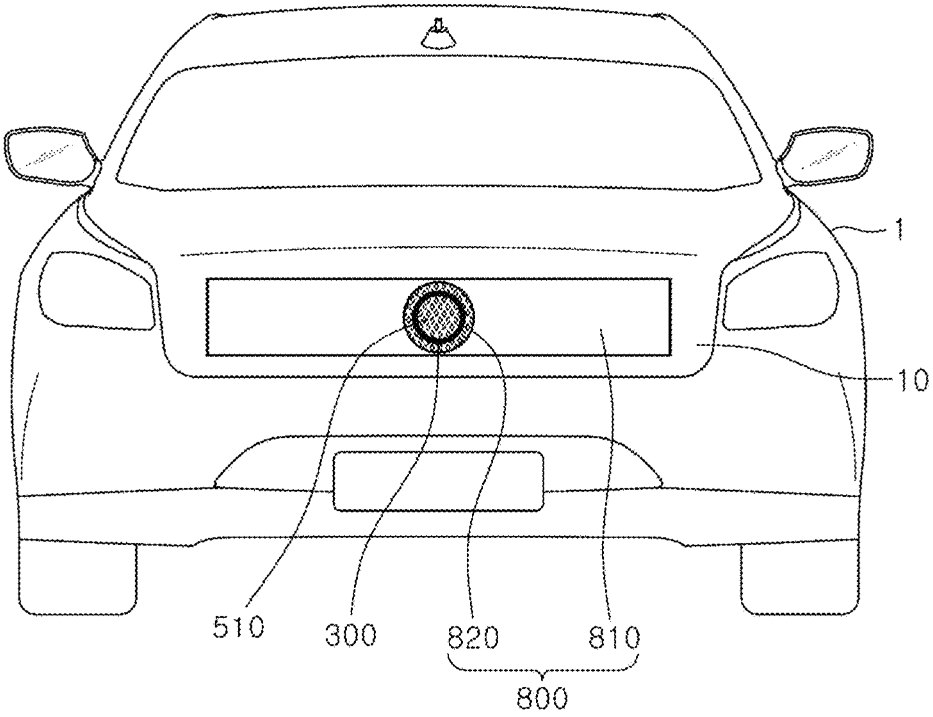
FIG. 6 is a view from the rear of a vehicle in which a light source unit is not turned on in a rear lamp device of the vehicle according to a second embodiment of the present disclosure.
Figure 7:
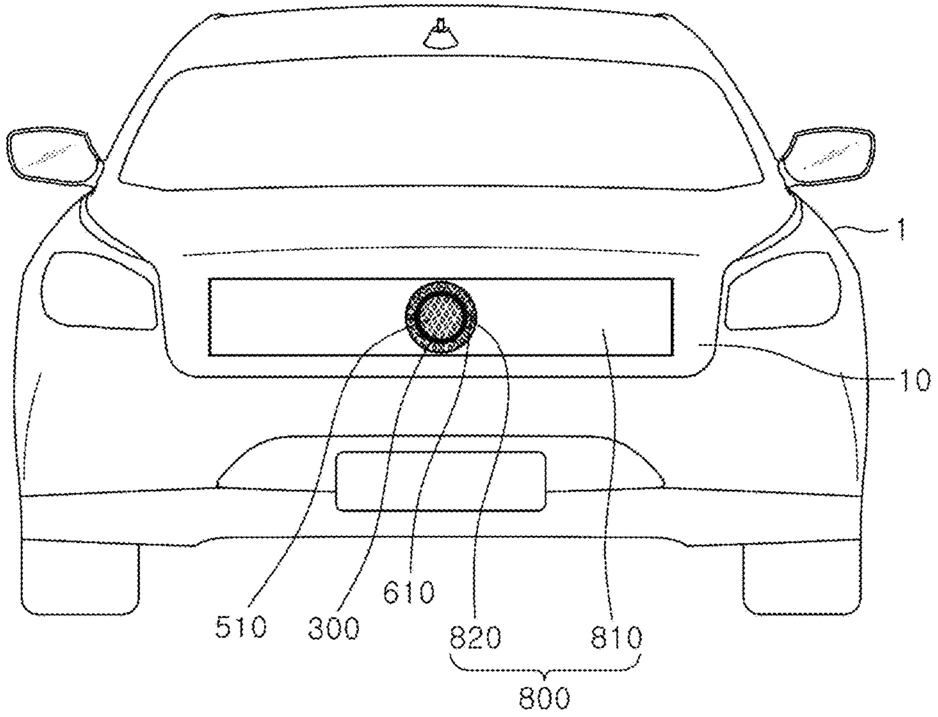
FIG. 7 is a view from the rear of a vehicle in which a light source unit is turned on in a rear lamp device of the vehicle according to a second embodiment of the present disclosure.
Figure 8:
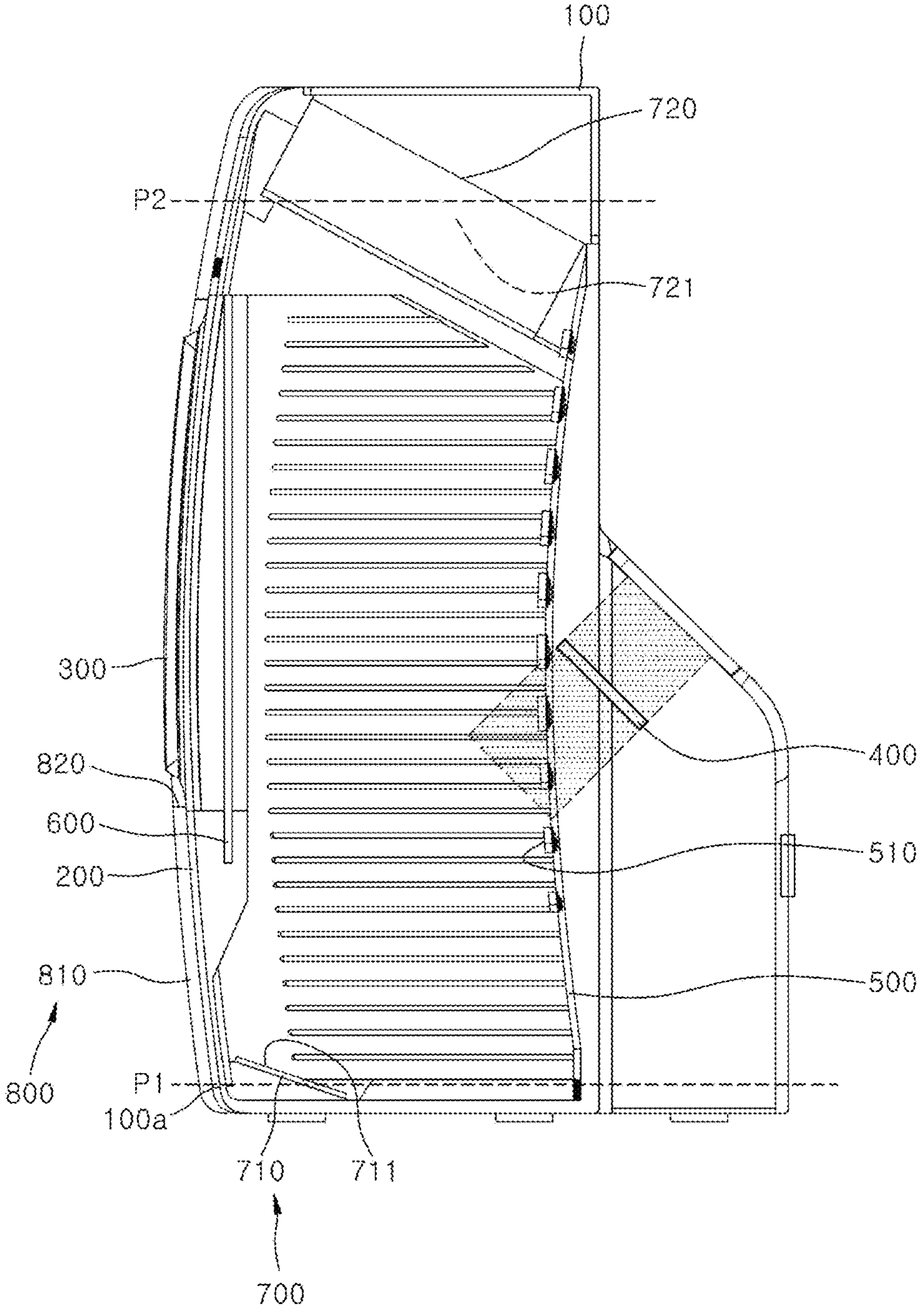
FIG. 8 is a schematic cross-sectional view of a rear lamp device of a vehicle according to a second embodiment of the present disclosure.
Figure 9:
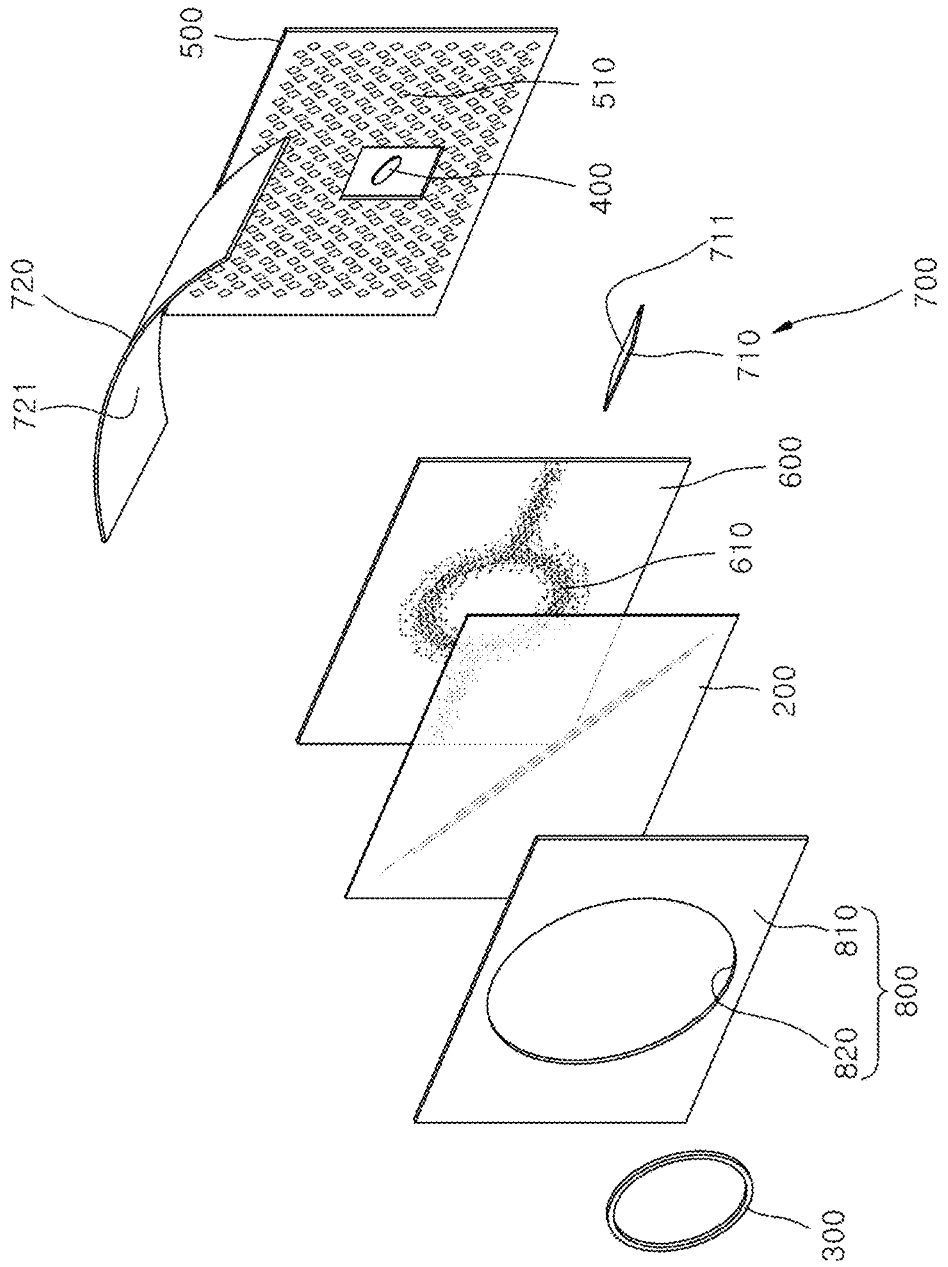
FIG. 9 is an exploded perspective view schematically illustrating a rear lamp device of a vehicle according to a second embodiment of the present disclosure.
Figure 10:
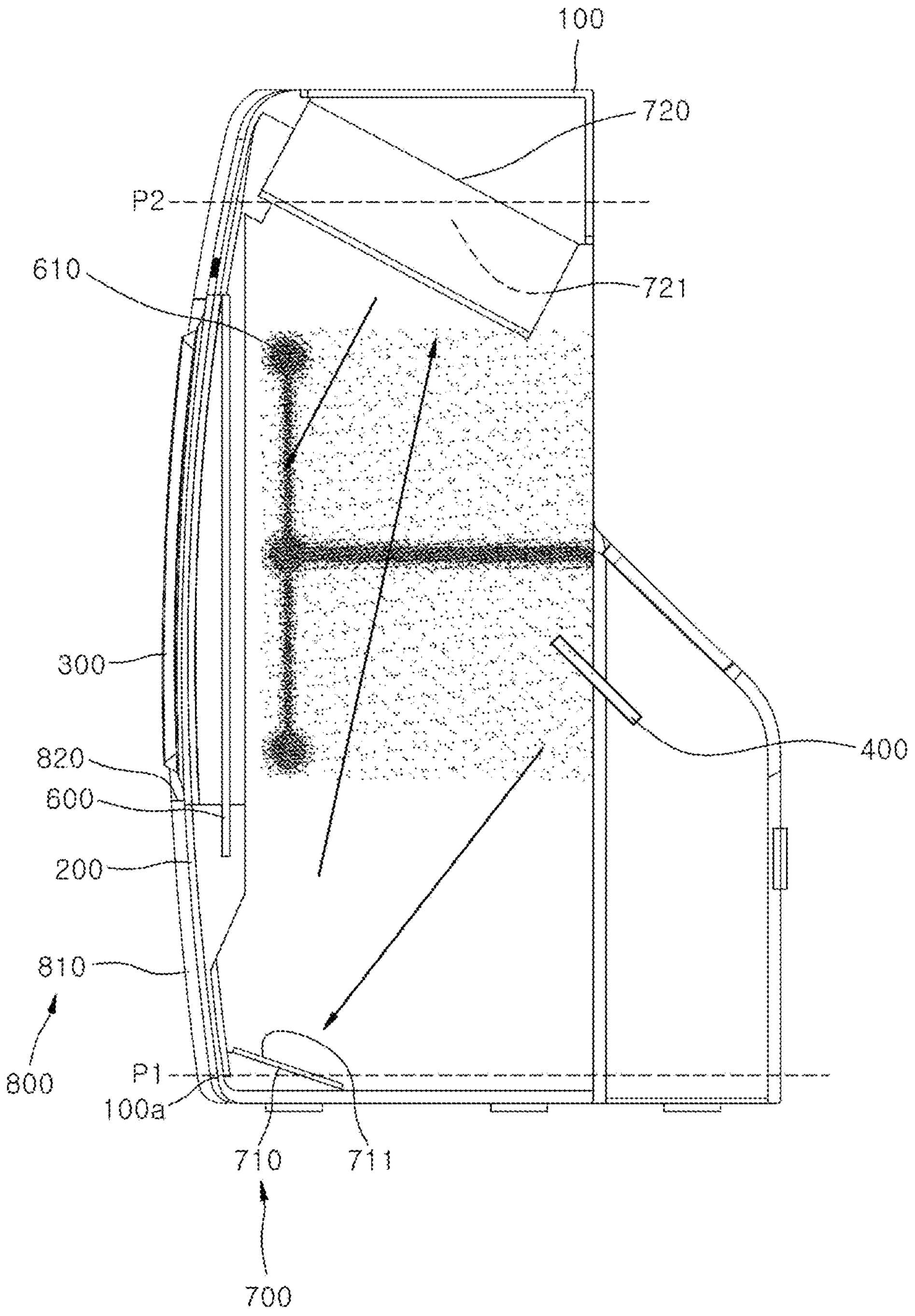
FIG. 10 is a view illustrating a path of light in a rear lamp device of a vehicle according to a second embodiment of the present disclosure.

FIG. 6 is a view from the rear of a vehicle in which a light source part is not turned on in a rear lamp device of a vehicle according to a second embodiment of the present disclosure. FIG. 7 is a view from the rear of the vehicle in which the light source part is turned on in the rear lamp device of a vehicle according to the second embodiment of the present disclosure. FIG. 8 is a schematic cross-sectional view of the rear lamp device of a vehicle according to the second embodiment of the present disclosure. FIG. 9 is an exploded perspective view schematically illustrating the rear lamp device of a vehicle according to the second embodiment of the present disclosure. FIG. 10 is a view illustrating a path of light in the rear lamp device of a vehicle according to the second embodiment of the present disclosure.

Referring to FIG. 6 to FIG. 10, the rear lamp device of a vehicle according to the second embodiment of the present disclosure includes a housing part 100, a lens part 200, an emblem part 300, a light source part 400, a bezel part 500, a hologram plate part 600, a reflection part 700, and a light blocking layer part 800.

In describing the rear lamp device of a vehicle according to the second embodiment of the present disclosure, only the light blocking layer part 800 not described in the rear lamp device of a vehicle according to the first embodiment of the present disclosure is described.

The description of the rear lamp device of a vehicle according to the first embodiment of the present disclosure may be applied as it is to the remaining components of the rear lamp device of a vehicle according to the second embodiment of the present disclosure.

The light blocking layer part 800 is provided in the lens part 200. The light blocking layer part 800 is provided on an outer surface of the lens part 200 facing the rear of the vehicle body 1. The light blocking layer part 800 partially blocks the light emitted from the light source part 400.

The light blocking layer part 800 according to the present embodiment includes a non-transmission part 810 and a light transmission part 820.

The non-transmission part 810 includes a non-transmissive material. The non-transmission part 810 blocks the light emitted from the light source part 400 or light from an external light source so as not to pass through the lens part 200.

The color of the non-transmission part 810 may be the same as the color of the vehicle body 1. In an embodiment, the non-transmission part 810 includes a paint layer painted on the surface of the lens part 200. The paint layer may include PUR coating. The color of the paint layer may be the same as the color of the vehicle body 1. In another embodiment, the non-transmission part 810 includes a film insert-injected into the surface of the lens part 200. The color of the film may be the same as the color of the vehicle body 1.

The light transmission part 820 may pass through the light emitted from the light source part 400. The light transmission part 820 may be formed by laser etching or laser drilling the non-transmission part 810.

In an embodiment, the light transmission part 820 may be formed by laser etching or laser drilling the paint layer painted on the lens part 200. In another embodiment, the light transmission part 820 may be formed by laser etching or laser drilling the film insert-injected into the lens part 200.

The light transmission part 820 may be disposed in a central portion of the light blocking layer part 800. The size of the light transmission part 820 may be greater than the size of the emblem part 300. Accordingly, the light transmission part 820 may not be interfered with the emblem part 300.

The holographic stereoscopic image 610 corresponding to the shape of the emblem part 300 can be recognized from the outside through the light transmission part 820.

A hidden lighting design may be implemented by forming the non-transmission part 810 in the form of a paint layer or film having the same color as the vehicle body 1 on the lens part 200 and forming the light transmission part 820 by laser etching or laser drilling on the non-transmission part 810.

Figure 11:
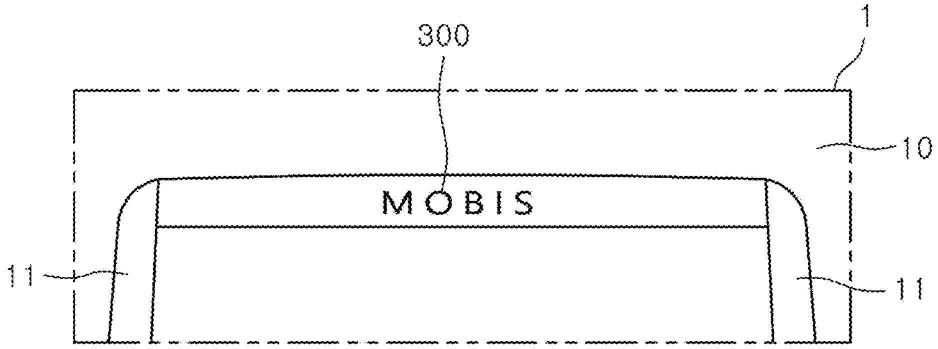
FIG. 11 is a view from the rear of a vehicle in which a tail lamp and a light source unit are not turned on in a rear lamp device of a vehicle according to an embodiment of the present disclosure.
Figure 12:
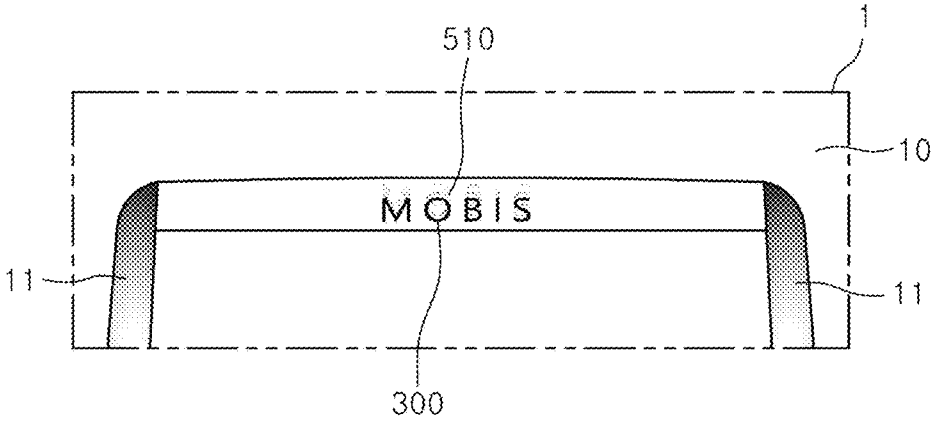
FIG. 12 is a view from the rear of a vehicle in which a tail lamp and a light source unit are both turned on in a rear lamp device of a vehicle according to an embodiment of the present disclosure.

FIG. 11 is a view from the rear of a vehicle in which a tail lamp and a light source part are not turned on in a rear lamp device of a vehicle according to an embodiment of the present disclosure. FIG. 12 is a view from the rear of the vehicle in which the tail lamp and the light source part are both turned on in the rear lamp device of a vehicle according to the embodiment of the present disclosure.

Referring to FIG. 11 and FIG. 12, a light source part 400 according to the present embodiment may be turned on together with the lighting of a tail lamp 11. When the tail lamp 11 provided at a rear portion 10 of a vehicle body 1 is turned on, the light source part 400 may be turned on in conjunction with the tail lamp 11.

The tail lamp 11 and the light source part 400 may be electrically connected to a controller such as an electronic control unit (ECU) of the vehicle. The controller receives an operation signal of the tail lamp 11 and controls the light source part 400. The controller controls a lighting operation or a turning-off operation of the light source part 400 so that the light source part 400 is turned on or turned off together with the tail lamp 11.

The rear lamp device of a vehicle according to the embodiment of the present disclosure can serve as the auxiliary tail lamp 11 when the light source part 400 is turned on, so that the lighting image of the vehicle can be differentiated through the holographic stereoscopic image 610 that matches the emblem part 300 disposed on the rear portion 10 of the vehicle body 1.

The rear lamp device of a vehicle according to an embodiment of the present disclosure can virtually express unrealistic rear lighting content that may not be implemented as an injection product in a 3D stereoscopic image through the combination of the hologram plate part 600 and the rear lighting structure.

The rear lamp device of a vehicle according to an embodiment of the present disclosure can reduce the weight of the vehicle and reduce the production cost by replacing the shape and injection product of the lens part 200 of various designs with the holographic stereoscopic image 610.

The rear lamp device of a vehicle according to an embodiment of the present disclosure can differentiate marketability by securing both non-lighting and lighting images.

The rear lamp device of a vehicle according to an embodiment of the present disclosure can enhance high-quality marketability through more stereoscopic and unpredictable lighting images by applying a hologram effect between external design elements such as garnish or the emblem part 300 and internal design elements such as the pattern unit 510 and the lighting pattern formed on the bezel part 500.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A rear lamp device for a vehicle, the rear lamp device comprising:

a housing part provided in a rear portion of a vehicle body;

a lens part coupled to the housing part and covering an opening provided in the housing part;

an emblem part provided in the lens part;

a light source part installed in the housing part and configured to irradiate light into an interior of the housing part;

a bezel part coupled to the housing part and disposed inside the housing part; and a holographic plate part disposed between the lens part and the bezel part, wherein a holographic stereoscopic image is displayed in response to the light source part being turned on.

2. The rear lamp device of claim 1, wherein the hologram plate part is configured to:

receive light irradiated from the light source part; and display the holographic stereoscopic image corresponding to a shape of the emblem part.

3. The rear lamp device of claim 1, further comprising:

a reflection part disposed between the light source part and the hologram plate part and configured to reflect the light emitted from the light source part toward the hologram plate part.

4. The rear lamp device of claim 3, wherein the reflection part comprises:

a first reflection part disposed at a first position of the housing part and configured to reflect the light emitted from the light source part; and a second reflection part disposed at a second position of the housing part spaced apart from the first reflection part and configured to face the first position to reflect light reflected by the first reflection portion toward the hologram plate part.

5. The rear lamp device of claim 4, wherein the second reflection part includes a reflection surface having a parabolic curved shape.

6. The rear lamp device of claim 1, further comprising:

a light blocking layer part provided on the lens part and disposed to partially block the light irradiated from the light source part.

7. The rear lamp device of claim 6, wherein the light blocking layer part comprises:

a non-transmission part through which the light irradiated from the light source part is not transmitted; and a light transmission part through which the light irradiated from the light source part passes.

8. The rear lamp device of claim 7, wherein the light transmission part does not interfere with the emblem part, and wherein the non-transmission part has the same color as the vehicle body.

9. The rear lamp device of claim 1, wherein the light source part is lit with a tail lamp.

10. The rear lamp device of claim 1, wherein the bezel part is further provided with a pattern unit that is recognized from outside through the lens part.

11. A lamp device for a vehicle, the lamp device comprising:

a housing part provided in a rear portion of a vehicle body;

a lens part coupled to the housing part and covering an opening provided in the housing part;

an emblem part provided in the lens part;

a light source part installed in the housing part;

a bezel part coupled to the housing part and disposed inside the housing part;

a holographic plate part disposed between the lens part and the bezel part; and a controller configured to:

control the light source to irradiate light into an interior of the housing part; and control the light source and the holographic part to display a holographic stereoscopic image.

12. The lamp device of claim 11, wherein the hologram plate part is configured to:

receive light irradiated from the light source part; and display the holographic stereoscopic image corresponding to a shape of the emblem part.

13. The lamp device of claim 11, further comprising:

a reflection part disposed between the light source part and the hologram plate part and configured to reflect the light emitted from the light source part toward the hologram plate part.

14. The lamp device of claim 11, further comprising:

a light blocking layer part provided on the lens part and disposed to partially block the light irradiated from the light source part.

15. The lamp device of claim 11, wherein the light source part is lit with a tail lamp.

16. The lamp device of claim 11, wherein the bezel part is further provided with a pattern unit that is recognized from outside through the lens part.

* * * * *